United States Patent [19]
Knaur et al.

[11] Patent Number: 5,305,102
[45] Date of Patent: Apr. 19, 1994

[54] HDTV RECEIVER

[75] Inventors: Scott C. Knaur, Mountainside; Kim N. Matthews, Watchung; Arun N. Netravali, Westfield; Eric D. Petajan, Watchung; Robert J. Safranek, New Providence, all of N.J.

[73] Assignee: AT&T Bell Laboratories, Murray Hill, N.J.

[21] Appl. No.: 919,802

[22] Filed: Jul. 27, 1992

[51] Int. Cl.⁵ .................... H04N 7/133; H04N 7/137
[52] U.S. Cl. .................................. 348/415; 348/725; 348/731
[58] Field of Search ............... 358/105, 136, 133, 188, 358/191.1; 375/27; H04N 7/133, 7/137

[56] References Cited
U.S. PATENT DOCUMENTS
5,134,477 7/1992 Knauer ............................. 358/136

Primary Examiner—Howard W. Britton
Attorney, Agent, or Firm—Henry T. Brendzel

[57] ABSTRACT

The effects of perturbations in a decoder responsive to a signal encoded in a predictive coding schema are reduced by shortening the time needed to converge the decoder's prediction signal to that of the encoder. This is accomplished by temporarily altering the leak factor when it is known that a perturbation is about to manifest itself and by, in some situations, altering the incoming encoded signal itself.

10 Claims, 3 Drawing Sheets

HDTV RECEIVER

BACKGROUND OF THE INVENTION

This invention relates to decoding of signals that are encoded with a predictive coding schema.

The subject matter disclosed herein is related to

U.S. Pat. No. 5,134,477, issued Jul. 28, 1992 [rel. app. 1],

U.S. Pat. No. 5,243,419, issued Sep. 7, 1993 [rel. app. 2],

U.S. patent application Ser. No. 07/817,206 filed Jan. 6, 1992 [rel. app. 3], and copending U.S. patent application Ser. No. 07/919,792 filed Jul. 27, 1992, titled "An Improved Adaptive Leak HDTV Encoder" [rel. app. 4].

In related copending application [rel. app. 1] an encoding schema is disclosed together with a corresponding decoder. The disclosed encoding and decoding is proposed for a terrestrial high definition television (HDTV) environment in the U.S., but the disclosed principles, of course, have a much broader applicability.

To briefly describe the disclosed arrangement, the input signal to be encoded is, for example, a video signal that comprises a concatenation of signal segments that correspond to signals that make up an image frame. That signal is evaluated in a forward estimation portion of the encoder and various parameters are developed by that evaluation. Thereafter, with the aid of the developed parameters, the signal is encoded and thereby substantially compressed, buffered, modulated and finally transmitted to the decoder (e.g., an HDTV receiver). Some of the parameters developed in the forward estimation portion of the encoder are also transmitted to the decoder, including motion vectors and image mean signals. In accordance with the teaching of the related copending application [rel. app. 1], the signals transmitted by the encoding portion comprise scale factor signals, quantized vector signals and vector codebook identifier signals.

In carrying out the differential encoding process, the encoder must be aware of the signals that the target receiver has, in order for the encoder to take account of whatever encoding/decoding errors are introduced by the process and cannot be avoided. To that end, the encoder includes a frame buffer that is populated with signals that are derived from the encoded signals created by the encoder.

At the decoder end, i.e., at the receiver, the received signal are decoded with the aid of a frame buffer that maintains the previously decoded signals. The frame buffer within the decoder corresponds to the aforementioned frame buffer within the encoder.

One problem with this approach, when strictly executed, is that errors introduced into the signal following the encoding process show up in the decoder's frame buffer and do not disappear. To ameliorate this potential problem, the disclosed encoder arrangement introduces a signal leak. That is, the encoder does not encode the difference between the cur-rent frame and a prediction of the current frame derived from the previous frame that is stored in the frame buffer. Rather, the signal that is encoded is the difference between the current frame and only a fraction of the prediction frame. In effect, a portion of the current frame is encoded, because it is not nullified by the prediction frame. That portion, called the "leak", is controlled in accordance with image characteristics and other parameters that relate to the encoder's operation. The actual control is realized by providing what effectively is a multiplication circuit responsive to the output of the frame buffer, which circuit multiplies its applied signals by a fraction. The leak signal is also transmitted to the decoder.

In the related application filed herewith [rel. app. 4], it is also disclosed that the encoder includes an output buffer. In order to maintain a constant delay between the encoder's input signal and the decoder's output signal, it is important to know the level of fullness of the encoder's output buffer (e.g., in terms of the number of image frames stored therein). Accordingly, related application [rel. app. 4] discloses an encoder that also transmits an output buffer fullness control signal.

The arrangement described above works well in that an injected perturbation, such as transmission noise entering the frame buffer, is removed within a number of image frames by virtue of the multiplication-by-a-fraction process that occurs at the output of the frame buffer. Still, such perturbations are not welcome, and whenever there is a priori information that such a perturbation is about to manifest itself, it would be beneficial to overcome it quickly.

SUMMARY OF THE INVENTION

In accordance with this invention, the effects of perturbations are reduced by shortening the time needed to converge the decoder's prediction signal to that of the encoder. This is accomplished by temporarily altering the leak factor when it is known that a perturbation is about to manifest itself and by, in some situations, altering the incoming encoded signal. In particular, when a decoder tuned to a particular encoder is directed to receive the signals of a different encoder (e.g., a channel change on an HDTV receiver), the incoming leak factor signal is set to 0 for one frame. During that frame, signals that are applied to the decoder are multiplied by a factor related to the incoming leak factor (as long as the incoming leak factor is not equal to 1). In some embodiments, the signals are multiplied in subsequent frames by another factor that is related to the incoming leak factor signal but that other factor is smaller in magnitude (but not less than 1). To maintain the encoder in proper operational state, an input buffer of the encoder is controlled, based on a buffer control signal appended to the incoming encoded signal. The buffer control signal causes one of three actions to be taken: nominal extraction of data from the input buffer, repeated extraction of the same data from the input buffer, or skipping of data in the input buffer.

DETAILED DESCRIPTION

Figure 1:
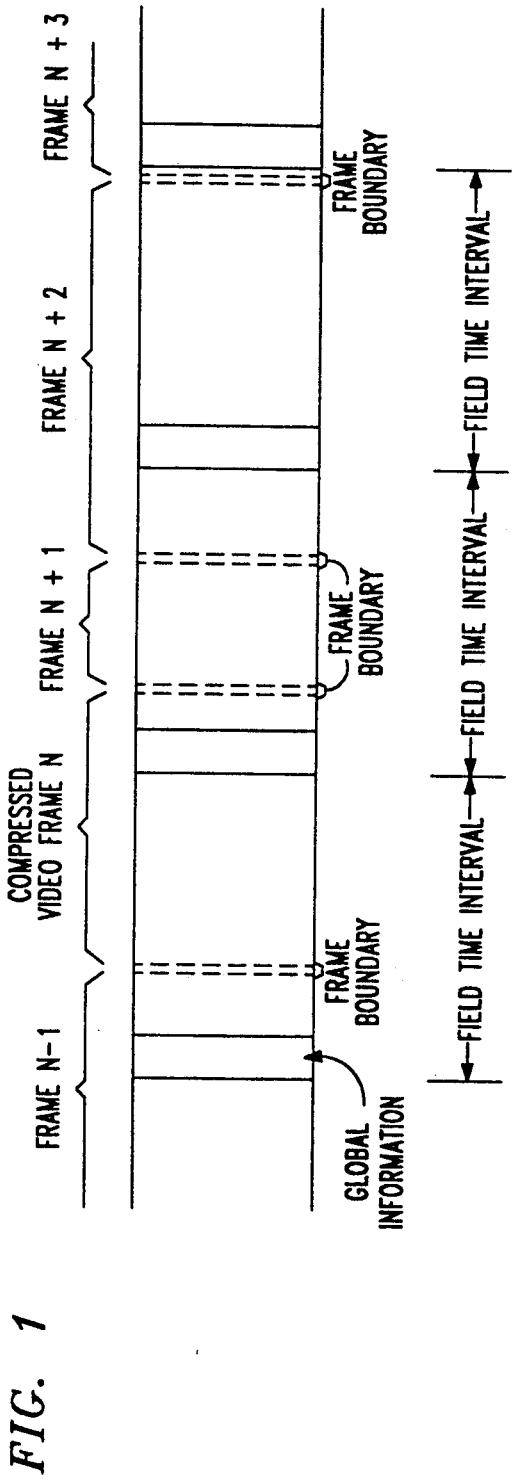
FIG. 1 presents a pictorial view of an HDTV data format.

FIG. 1 presents a high definition television (HDTV) format disclosed in the aforementioned related applications [rel. app. 2] and [rel.app. 3]. In accordance with one aspect of the format there exist multiple field time intervals, each of which corresponds to the frame interval of a video camera and is approximately 1/60th of a second (specifically 1/59.94 of a second). In accordance with another aspect of the format, there is the compressed video frame information, which corresponds to the data generated from a frame of the camera's output signal. Each field time interval begins with global information that contains parameters that are fixed-length encoded. The coded parameters contained in the global segments are, for example, the scale and leak factors, luminance and chrominance mean values, buffer fullness signal, frame number, and the frame number of the frame following the global segment. The remainder of each field time interval is devoted to high definition frame data which is encoded with a variable-length coding scheme (slice data).

Figure 2:
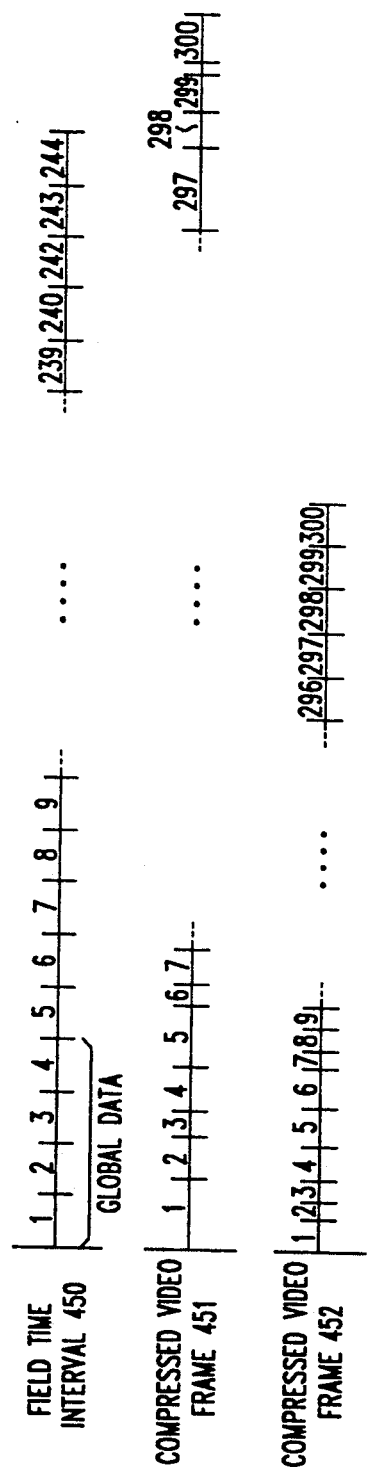
FIG. 2 illustrates the output data divisions and the compressed data slices.
Figure 3:
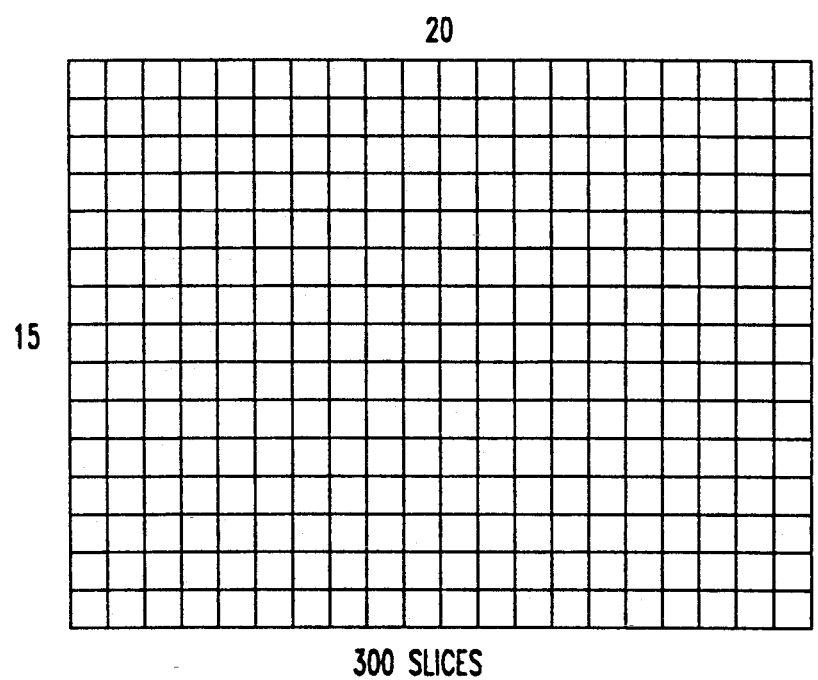
FIG. 3 depicts the image sections represented by the slices.

FIG. 2 shows a field time interval 450 which contains 244 slots and compressed video frames 451 and 452 which contain 300 slices each. The 300 slice array is derived from the image that is divided, as illustrated in FIG. 3, into 20 rows and 15 columns. The amount of data that each slice generates varies in accordance with the image data produced and, thus, compressed video frames 451 and 452 have different lengths.

It may be noted that FIGS. 1 and 2 relate to a particular input signal format, but the principles of this invention do not depend on this, or any other, signal format.

Figure 4:
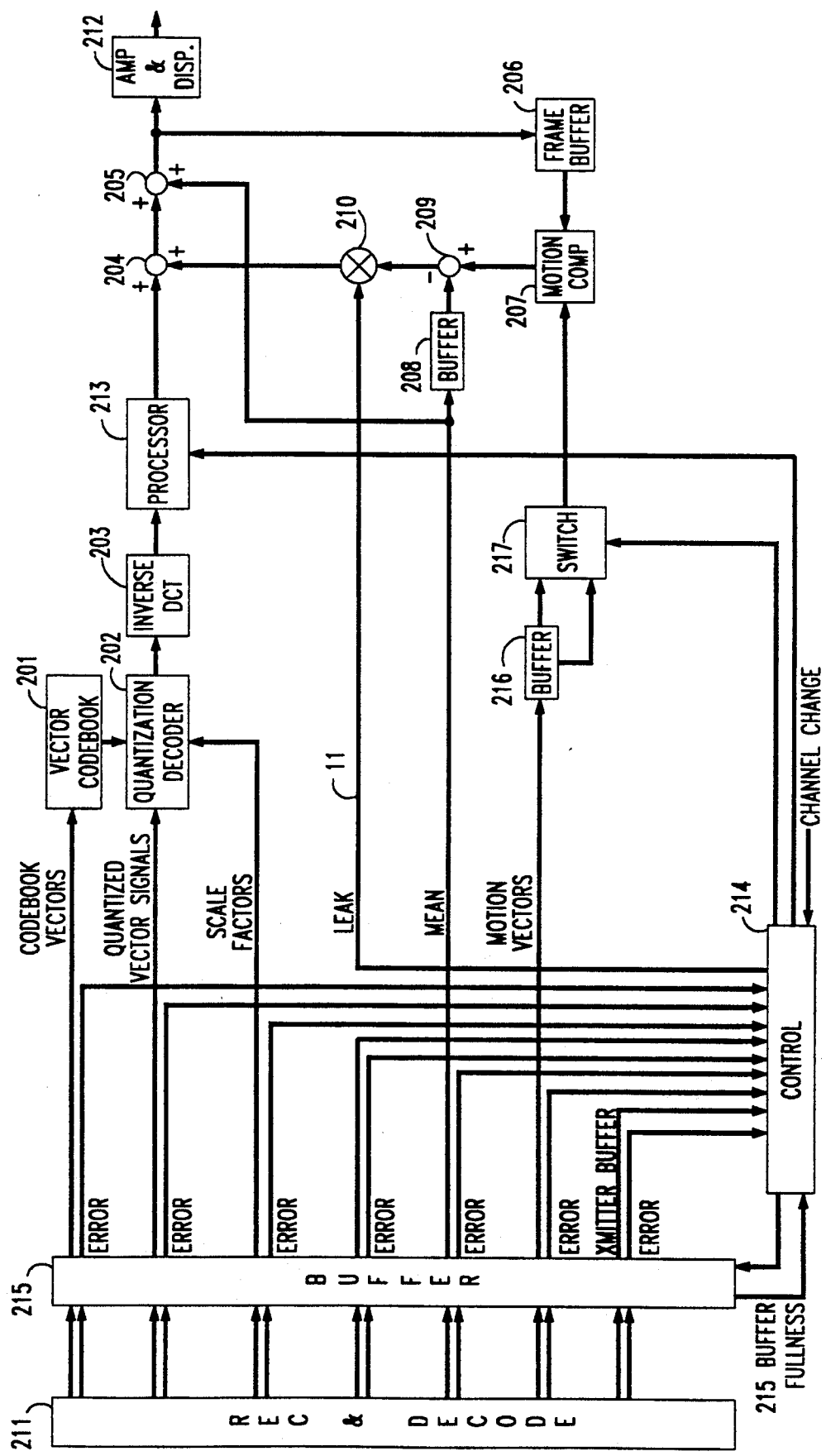
FIG. 4 presents a block diagram of a decoder in accordance with the principles of this invention.

FIG. 4 presents a block diagram of a decoder responsive to signals as described above. It receives signals, e.g., from an antenna, decodes those signals in block 21 1, separates the signals into their proper components and delivers the signal components with corresponding error indicators to input buffer 215. In due time the same signals are extracted from buffer 215 and applied to the succeeding elements.

The process in the decoder begins with the codebook vector identifiers applied to a vector code book 201, and the quantized vector signals and the scale factors applied to quantization decoder 202. Blocks 201 and 202 correspond to blocks 102 and 103, respectively, of FIG. 11 in related application [rel. app. 1], and together they form an inverse quantization element akin to element 39 of FIG. 2 in related application [rel. app. 1]. The output of the inverse quantization element is applied to an inverse DCT transform circuit 203 and that output, after passing through processor 213, is combined in adder 204 with signals already stored in the decoder.

Since the quantized vector signals of a frame were created from image signals with the frame mean deleted, the output of adder 204 is missing the frame mean. This is remedied in adder 205, which adds the frame mean. The output signals of adder 205 form the frame output of the decoder. This output is applied to amplifier-and-display circuit 212 and to frame buffer circuit 206, where one frame's worth of information is stored. For each frame that is stored in buffer circuit 206, buffer circuit 206 outputs the previous frame. The previous frame signal is augmented in motion compensation block 207 which, in response to the applied motion signals, forms an estimate of the current frame. Motion compensation block 207 is identical to motion compensation block 43 in FIG. 2 of related application [rel. app. 1]. The frame mean is subtracted from the output of motion compensation block 207 by subtracting therefrom the previous frame's mean in subtracter 209. The previous frame's mean is obtained from buffer 208, into which the current frame's mean is inserted. Finally, the output of subtracter 209 is applied to multiplier 210, which multiplies that signal by the leak factor signal.

The output of multiplier 210 is the signal that is employed in adder 204 as described above.

The description so far basically summarizes the subject matter disclosed in the aforementioned related applications. To form a more robust decoder (e.g., HDTV receiver) the sources of perturbations must be addressed and their effects reduced. The types of perturbations that are most prominent are channel changes (where the decoder suddenly tunes to the signal of a different encoder), errors in received signals, and potential overflows or underflows in input buffer 215.

CHANNEL CHANGE

A user of an HDTV can alter the source of the signals applied to the decoder at any time by directing a change in the tuned channel. At such a time, the signals that arrive at adder 204 are no longer related to the signals stored in frame buffer 206 and the result at the output of element 212 is neither the old image, nor the new image. With a large enough number of image frames processed (and time elapsed) the leak process will establish the new picture. However, it is desirable to make this perturbation as short as practical.

Since the channel change can occur at any time, there is no assurance of any particular leak factor value at the time of the channel change. It is known, however, that the leak factor can be 1, 0, or a multiple of a negative power of 2, such as a multiple of 1/16.

A leak factor of 1 can be transmitted by the encoder whenever the encoder determines that it needs to devote its bandwidth to other information. A leak factor of 1 is also transmitted by the encoder whenever it wishes to send a leak factor that is greater than the highest multiple of the negative power of 2 that is employed (e.g., greater than 15/16). This greater leak factor is achieved by sending a sequence of leak factors, such as the sequence: 15/16, 1, 1, 1, 1, 1, 1, 1 (the effective leak factor of this sequence is 127/128).

A leak factor of 0 is likely to be transmitted whenever it is expected that the predictive signal out of the encoder's frame buffer would be particularly poor. At such times it makes sense to discard the predictive signal all together—and that suggests a leak factor of 0. A discontinuity in the signal applied to the encoder, such as at a scene change, is the simplest (and most often occurrings) example of signal situation that suggests a 0 leak factor. In embodiments where the encoder employs leak factor sequences, it is also possible to employ a leak factor sequence that purposely includes a 0 leak factor. For example, the ramp-like sequence 8/16, 11/16, 13/16, 15/16, 1, 1, 1, 1 yields the effective leak factor of 111/128, and the sequence 15/16, 1, 1, 1, 1, 1, 1, 0 yields the same effective leak factor. However, the latter sequence includes a 0 leak factor entry, and may be quite beneficial to the system's operation. In effect, the resulting system is a "non-predictive coding" system some of the time.

Returning to the issue of channel changes in the decoder, one should recognize that the situation is a bit different from that of a scene change, in the following sense. When the encoder is faced with a signal that represents a scene change, the encoder has the option of ignoring that fact and using the prediction signal as best it can. In the case of a channel change, however, the signal stored in the frame buffer is of no use whatsoever. As indicated above, if one continues to employ that signal the perturbation will nevertheless be removed in time but, still, it makes more sense to not employ that signal at all.

In accordance with one embodiment of this invention, therefore, when a channel change signal is received by control block 214, a leak factor of 0 is generated on line 11, thereby discarding the contents of frame buffer 206. The next question, however, is what signal is to be applied to adder 204 from processor 213. Addressing this question, the signal out of element 203 corresponds to $$A - \alpha A'$$

where A is the signal applied to the encoder, A' is the prediction of signal A, and $\alpha$ is the leak factor employed by the encoder. The signal A', however, can be expressed as A—error and, therefore, the above degenerates to $$(1-\alpha)A + \alpha \text{error}.$$

The above suggests that processor 213 should multiply the output of element of element 203 by $1/(1-\alpha)$; as long as the leak factor, $\alpha$ is not 1. When that happens, however, there is an error signal that is created by the second term in the expression—$(\alpha \times \text{error})/(1-\alpha)$. That error signal can be left to be removed in the normal course of the leak process, or its removal can be assisting by, again, modifying the leak. Thus, in accordance with one embodiment of this invention, when a channel change occurs, control block 214 waits until a leak factor other than 1 arrives, at that time sets the leak factor on line 11 to 0 and directs processor 213 to multiply its input signal by $1/(1-\alpha)$. In accordance with another embodiment of this invention, the multiplication factor applied to element 213 is $1/(1-\alpha)$ at the first frame having a leak factor other than 1, and then diminishes with each frame toward the level 1 in accordance with any selected pattern. One such pattern may be an exponential decay as a function of the number of frames.

Of course, a happy circumstance occurs when a leak factor of 0 happens to arrive with the signal. In such an event, processor 213 simply transfers its input signal to its output and control 214 merely transfers the incoming leak factor of 0 to line 11.

ERROR MASKING

When some of the signals arrive at the decoder corrupted by transmission medium, it is important to not accept those signal portions into the receiver's buffer. It is the function of control 214 to evaluate the error signals supplied by input buffer 215 and take the appropriate action.

When the motion vectors are valid and the signals developed by element 203 that are in error (due to errors in the codebook vector identifiers, in the scale factors or in the quantized vector signals), it is best to keep the best predicted information about those signals. Accordingly, for those signals control 214 sets the leak factor at line 11 to 1 and causes processor 213 to discard the input signals (multiply the input signals by 0). However, when the incoming signal has a leak factor of 0—which signals an expectation at the transmitter that the receiver will discard its frame buffer information—then the leak factor is left at 0, causing a 0 signal to be outputted and stored in frame buffer 206.

When the motion vectors are not valid but the data signals are valid, then motion vectors from a previous frame before are used to move the information. This is accomplished with a buffer 216 and switch 217 responsive to a signal from control element 214. Also, if the encoder sends an additional signal that indicates, for example, that most of the encoded image is a "still image", then when a motion vector error is detected, a zero motion vector can be employed rather than the motion vector of a previous frame. This "still image" concept can be employed in connection with the transmission of movie material.

Lastly, for those frame buffer 206 signals that were stored with 0 values, at subsequent frames it is possible to employ the above-described approach of amplifying the incoming information by $1/(1-\alpha)$ to more speedily converge the receiver's buffer to the transmitter's buffer. Of course, control 214 would need to include a memory for maintaining a record of where the extra amplification should be applied.

As an aside, the error detection carried out in element 211 is not described here because it is completely conventional. It is expected that the transmitter will send signals with error detection and correction codes; and to the extent that an error is detected and not corrected, the above-described procedure kicks in.

INPUT BUFFER CONTROL

In the context of HDTV, the need for input buffer 215 arises from the following. The encoder's input signal arrives with uniform signal segments of image frame signals. That's the first rate of transmission. The encoder compresses and encodes the signal, and develops data that corresponds to the image frame signals; but the amount of data differs from frame to frame (see FIG. 1). That developed data is converted to symbols, modulated and communicated to the receiver over a transmission medium having its own, second, rate of transmission. The receiver decodes the information and delivers the decoded information to element 211, at the first rate of transmission.

If data is not to be lost, all of the data that enters the encoder should be delivered by the decoder. Therefore, there should be a constant number of frames that are in transit between the input of the encoder and the output of the decoder. The function of the output buffer in the encoder and the input buffer in the decoder (215) is to negotiate data between the two transmission rates and between the two buffers to insure a constant number of frames in transit, without overflow or under flow in either of the two buffers. To that end, as indicated above, the encoder transmits to the decoder the number of frames (x) that are contained in its output buffer. Of course, the danger of overflow is that data would be lost, and the danger of underflow is that data would be needed and none could be found.

The number of frames in input buffer 215 should be $N-x$, if N is the number of frames in transit and x is the number of frames in the encoder's output buffer. Alas, there are circumstances where the number of frames in the decoder's input buffer 215 is not $N-x$. This can occur when frames are lost in transit due to major bursts of error, when compressed signals (from different encoder sources) are spliced together without due regard for the output buffer states of the encoder sources, or when the decoder tunes to a new channel. In all cases, it behooves the decoder to alter the fullness of its input buffer 215 to approach the level $N-x$.

Fortuitously, once the above-described buffer control problem is realized, its solution is fairly simple.

When the receiver's buffer is too full, an entire frame can be ignored and skipped. The input buffer simply assumes that this data does not exist and that the buffer is emptier than it is. When the buffer is underutilized, a current frame can be repeated to create time for the buffer to fill up with additional frames.

We claim:

1. A decoder including means for receiving incoming signals and developing therefrom displaced frame difference signals and leak factor signals, an adder for combining signals related to the displaced frame difference signals with prediction signals, a buffer for storing signals responsive to the adder, and means for altering signals outputted by the buffer in response to the leak factor signals to develop thereby the prediction signals, wherein the improvement comprises:

error detection means for developing an error signal that identifies errors in the displaced frame difference signals, and first means for modifying the leak factor signals applied to the means for altering based on the error signal.

2. The decoder of claim 1 wherein the means for receiving also develops motion vector signals, the buffer includes MV means for altering the output signals of the buffer under control of the motion vector signals, the error detection means includes means for identifying errors in the motion vector signals; and the MV means includes a buffer for storing motion vectors and for selecting stored or unstored motion vectors to control the altering of the output signals of the buffer.

3. The decoder of claim 1 further comprising means for altering the leak signal in response to a channel change signal applied to the decoder.

4. The decoder of claim 1 further comprising means for altering the leak signal in response to a channel change signal that is unrelated to the signal applied to the means for receiving.

5. The decoder of claim 4 further comprising second means for modifying, interposed before the adder, for changing the displaced frame difference signals in response to the channel change signal.

6. The decoder of claim 5 wherein the second means for modifying is also responsive to the received leak factor signals.

7. The decoder of claim 6 wherein the incoming signals arrive in frame segments and, in response to the channel change signal, when the leak factor signal is other than equal to 1, the first means for modifying changes the leak factor signal applied to the means for altering to 0 for one frame and the second means for modifying multiplies the displaced frame difference signals by $1/(1-\alpha)$ during that one frame, where $\alpha$ is the leak factor signal.

8. The decoder of claim 7 where, whenever the second means for modifying multiplies the displaced frame difference signals by $1/(1-\alpha)$ during one frame, it also multiplies the displaced frame difference signals by a smaller multiplier during the frame following the one frame, provided that smaller multiplier is not smaller than $1/(1-\alpha')$, where $\alpha'$ is the leak factor signal of the frame following the one frame.

9. Apparatus responsive to an input signal that includes displaced frame difference data signals and a buffer control signal, comprising:

an input buffer for storing the input signal, means for determining the fullness level of the input buffer, A decoder responsive to signals stored in the input buffer, means for evaluating the fullness level of the input buffer with reference to the buffer control signal to develop a comparison signal;

means for taking action A, B, or C in response to the comparison signal, where action A is applying at least a subset of the signals stored in the input buffer to the decoder, action B is re-applying at least a subset of the signals stored in the input buffer to the decoder, and action C is skipping over a subset of the signals stored in the input buffer and sending another subset of signals stored in the input buffer to the decoder.

10. The apparatus of claim 9 wherein the input signal arrives in frame segments of non-uniform length and the buffer control signal is a number of frames and the means for evaluating the fullness level of the input buffer determines the number of frames stored in the input buffer.

* * * * *